(12) United States Patent
Kelkar et al.

(10) Patent No.: US 8,914,573 B2
(45) Date of Patent: Dec. 16, 2014

(54) METHOD AND SYSTEM FOR MITIGATING ADJACENT TRACK ERASURE IN HARD DISK DRIVES

(71) Applicant: International Business Machines Corporation, Armonk, NY (US)

(72) Inventors: Bhooshan P. Kelkar, Pune (IN); Abhinay R. Nagpal, Pune (IN); Sandeep R. Patil, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/935,119

(22) Filed: Jul. 3, 2013

(65) Prior Publication Data

US 2013/0293980 A1 Nov. 7, 2013

Related U.S. Application Data

(63) Continuation of application No. 12/902,150, filed on Oct. 12, 2010, now abandoned.

(51) Int. Cl.
| | |
|---|---|
| *G06F 12/10* | (2006.01) |
| *G11B 5/012* | (2006.01) |
| *G11B 20/00* | (2006.01) |
| *G11B 20/12* | (2006.01) |
| *G11B 19/04* | (2006.01) |

(52) U.S. Cl.
CPC ............ *G11B 20/1258* (2013.01); *G11B 5/012* (2013.01); *G11B 20/00666* (2013.01); *G11B 19/045* (2013.01); *G11B 2220/2516* (2013.01)
USPC ............. 711/106; 711/165; 711/170; 714/6.1

(58) Field of Classification Search
USPC ............................ 711/106, 165, 170; 714/6.1
See application file for complete search history.

(56) References Cited

U.S. PATENT DOCUMENTS

| | | | |
|---|---|---|---|
| 5,774,715 | A | 6/1998 | Madany et al. |
| 6,178,058 | B1 | 1/2001 | Pan et al. |
| 6,202,118 | B1 | 3/2001 | Klein |
| 6,400,892 | B1 | 6/2002 | Smith |
| 6,496,913 | B1 | 12/2002 | Taugher et al. |

(Continued)

OTHER PUBLICATIONS

Tang et al., "Understanding Adjacent Track Erasure in Discrete Track Media." IEEE Transactions on Magnetics, Sep. 2008; all pages.

(Continued)

*Primary Examiner* — Jae Yu
(74) *Attorney, Agent, or Firm* — North Shore Patents, P.C.; Michele Liu Baillie

(57) ABSTRACT

A method, system, and computer program product for mitigating adjacent track erasures in hard disks, includes: determining input/output (I/O) characteristics for a plurality of blocks on a hard disk; assigning the plurality of blocks to a plurality of categories of I/O characteristics by the processor; and clustering content of the blocks assigned to the same category in one or more continuous tracks on the hard disk. Each block is assigned to one category. Blocks with similar I/O characteristics are clustered on one or more continuous tracks. By performing this clustering, blocks with a high number of I/O operations are grouped and stored on fewer tracks than if they were scattered across numerous tracks. This reduces the number of tracks experiencing a high number of I/O operations, and in turn, the amount of refreshing of adjacent tracks is reduced.

19 Claims, 4 Drawing Sheets

(56) References Cited

U.S. PATENT DOCUMENTS

| | | | |
|---|---|---|---|
| 6,972,920 | B2 | 12/2005 | Kim et al. |
| 7,197,433 | B2 | 3/2007 | Patel et al. |
| 7,272,735 | B2 | 9/2007 | Fung |
| 7,325,095 | B2 | 1/2008 | Williams |
| 7,373,268 | B1 | 5/2008 | Viredaz et al. |
| 7,447,920 | B2 | 11/2008 | Sharma et al. |
| 7,706,091 | B2 | 4/2010 | Furuhashi et al. |
| 7,733,589 | B2 | 6/2010 | Wada et al. |
| 7,747,907 | B2 | 6/2010 | Olds et al. |
| 2004/0250029 | A1 | 12/2004 | Ji et al. |
| 2005/0050392 | A1* | 3/2005 | Baba et al. ............... 714/25 |
| 2005/0086651 | A1 | 4/2005 | Yamamoto et al. |
| 2006/0112286 | A1 | 5/2006 | Whalley et al. |
| 2006/0132954 | A1 | 6/2006 | Wada et al. |
| 2008/0234873 | A1 | 9/2008 | Gorbatov et al. |
| 2009/0113160 | A1 | 4/2009 | Ferraro |
| 2009/0135693 | A1 | 5/2009 | Kim et al. |
| 2009/0195902 | A1 | 8/2009 | Moser et al. |
| 2009/0237842 | A1 | 9/2009 | Ehrlich |
| 2009/0244775 | A1 | 10/2009 | Ehrlich |
| 2009/0327250 | A1 | 12/2009 | Green et al. |

OTHER PUBLICATIONS

Karabuto, A., "HDD Diet: Power Consumption and Heat Dissipation," iXBD Labs; Jul. 11, 2005; all pages.
Karabuto, Al., "HDD Diet 2: Power Consumption and Heat Dissipation of Enterprise Hard Disk Drives," iXBD Labs; Mar. 2, 2006; all pages.
MAC Performance Guide: Why You Need More Space Than You Need, Jun. 1, 2009; all pages.
"HP Announces 'Smart' Cooling Solution for Data Centers"; Jun. 2003; all pages.
Weston, "Greening the Data Center," Sep. 2010; all pages.
"Software as a Service (SaaS)"; Jan. 2010; all pages.
Rosenberg, "IBM takes to Amazon's EC2 cloud," Feb. 11, 2009; all pages.
"Fans—Efficiency and Power Consumption," The Engineering ToolBox; Mar. 2006; all pages.
Bitar, "Deploying Hybrid Storage Pools With Sun Flash Technology and the Solaris ZFS™ File System," Sun Blueprints™ Online, Sun Microsystems, Part No. 820-5881-10, Revision 1.0, Oct. 31, 2008; all pages.
Mearian, "Seagate hybrid drive delivers SSD performance at HDD price," May 24, 2010; all pages.
Weil et al., "CRUSH: Controlled, Scalable, Decentralized Placement of Replicated Data," IEEE; Nov. 2006; all pages.
"'How Is Defragmentation Affected by New Storage Technologies? (SAN/RAID/SATA)," Defrag Tech Spotlight!, Diskeeper Corporation; Nov. 2008; all pages.
"New Fuzzy Logic Tools Simplify Programming for Motorola Microcontrollers," Business Wire, Oct. 6, 1997; all pages.
Saeedi et al., "Using Ant Colony Meta-Heuristic Approach for Cellular Manufacturing System"; Dec. 2008; all pages.
Doriego et al., "Ant colonies for the traveling salesman problem," BioSystems 43, pp. 73-81; Jul. 1997; all pages.
Korosec et al., "A Multilevel Ant-Colony-Optimization Algorithm for Mesh Partitioning"; International Journal of Pure and Applied Mathematics, vol. 5, No. 2; Jan. 2003; pp. 143-159.
"Data Center Power Management Enhancement for Energy Efficiency," IBM, IPCOM000182603D, May 4, 2009; all pages.
"Dynamic Thermal Mapping and Trend Analysis As a Control Mechanism for HVAC Systems in Data Centers," IBM, IPCOM000135036D, Mar. 27, 2006; all pages.
"Energy efficient cooling system for Data Center," IBM, IPCOM000182040D, Apr. 23, 2009; all pages.
Wehner, "Selbstorganisation im Superorganismus Kollektiv Intelligenz sozialer Insekten," Forschung and Technik, Jan. 14, 1998; all pages.
faculty.uscupstate.edu/atzacheva/SHIM450/KMeansExample.doc; Nov. 12, 2007; all pages.
Walker, IBM TDB, "Space Allocation on Direct Access Storage Device," IP.com number: IPCOM000054724D; Mar. 1, 1980; all pages.
Lenovo, "Prevention of Adjacent Track Interference on HDDs," IP.com number: IPCOM000142898D, IP.com Electronic Publication: Nov. 9, 2006; all pages.
k-means clustering, From Wikipedia, the free encyclopedia; Sep. 14, 2010; all pages.
"Gartner Says a Green Data Centre Means More than Energy Efficiency," Oct. 20, 2008; all pages.
"IBM Unveils Plan to Combat Data Center Energy Crisis; Allocates $1 Billion to Advance "Green" Technology and Services," May 10, 2007; all pages.
"IBM Project Big Green Tackles Global Energy Crisis," Jun. 11, 2008; all pages.
Fichera et al., "Power and Cooling Heat Up the Data Center," Mar. 8, 2006; all pages.
Pfeifer, R. et al., "Understanding Intelligence", The MIT Press; Sep. 24, 1999; all pages.

* cited by examiner

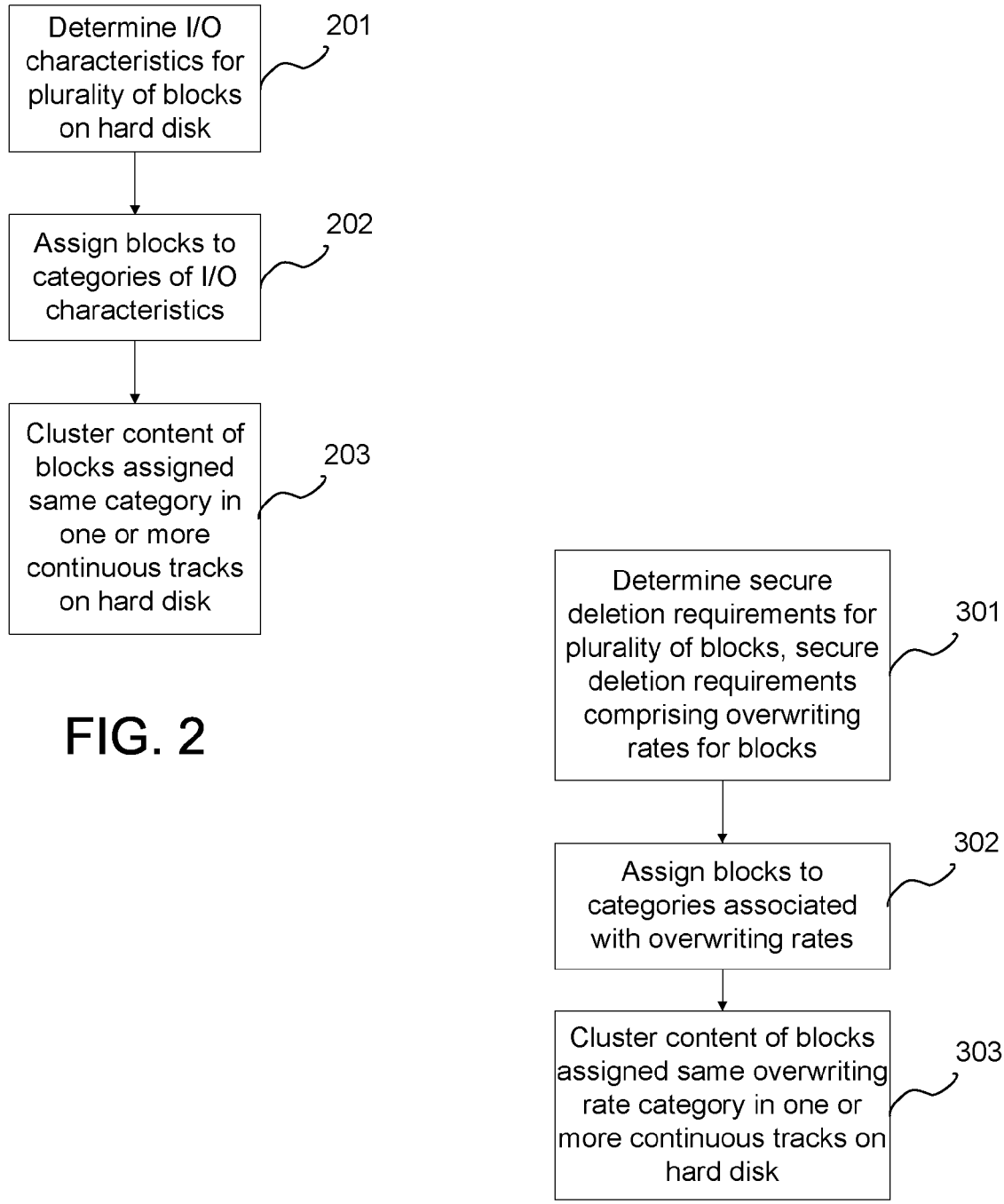

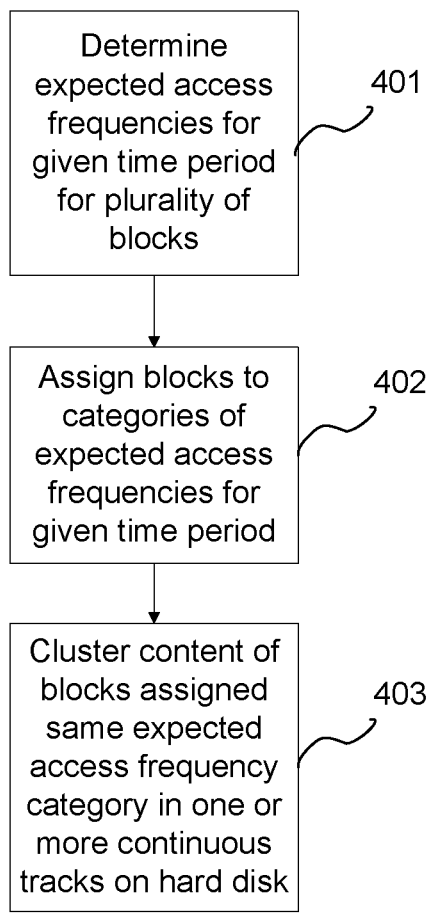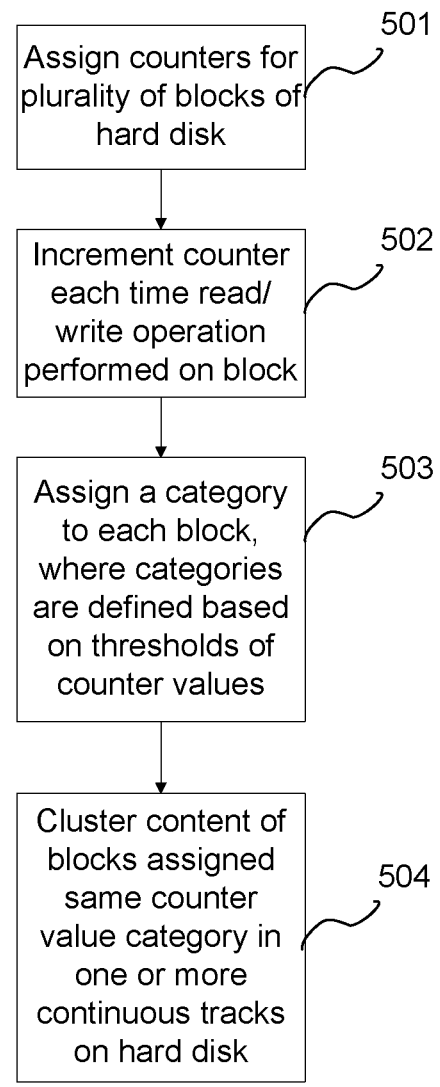
FIG. 4
FIG. 5

METHOD AND SYSTEM FOR MITIGATING ADJACENT TRACK ERASURE IN HARD DISK DRIVES

CROSS-REFERENCE TO RELATED APPLICATIONS

The present application is a continuation of co-pending U.S. patent application Ser. No. 12/902,150, filed on Oct. 12, 2010, and is related to U.S. patent application Ser. No. 12/941,016, filed on Nov. 5, 2010.

BACKGROUND

Secure deletion of data on non-volatile magnetic data storage, such as a hard disk, is an act of securely purging the data such that there are no residuals of the data on the hard disk. Regulations exist which mandate the need for secure deletion according to various standards, such as that published by the U.S. Department of Defense. A hard disk drive includes one or more hard disks clamped to a rotating spindle and at least one head for reading or writing data on the disk. Storage on a hard disk is divided into "blocks", which are in turn grouped into "tracks". A disk head uses magnetism to read or write data onto the tracks. Secure deletion involves the overwriting of blocks on a track by the disk head numerous times, depending on the standard being applied. Thus, secure deletion involves multiple input/output (I/O) operations on the same blocks of a track.

As a track on the hard disk is written, adjacent tracks may be overwritten by the magnetic field generated in the disk head, and data recorded in the adjacent tracks may be erased or corrupted as a result. This phenomenon is called adjacent track erasure (ATE) or adjacent track interference (ATI) and are aggravated by the multiple overwrites required by secure deletion.

In one approach to counter ATE or ATI, when a track has been overwritten a certain number of times, the adjacent tracks are read and rewritten, hence refreshing the data on the adjacent tracks. However, the I/O operations required in the refreshing of the adjacent tracks impose a performance penalty on the hard disk drive. With the aggravation of the ATE and ATI phenomenon due to secure deletion requirements, the need to refresh adjacent tracks become more frequent, imposing an even high performance penalty on the hard disk drive.

BRIEF SUMMARY

According to one embodiment of the present invention, a method for mitigating adjacent track erasures in hard disks, the computer operationally coupled to a processor, the method comprising: determining input/output (I/O) characteristics for a plurality of blocks on a hard disk by the processor; assigning the plurality of blocks to a plurality of categories of I/O characteristics by the processor; and clustering content of the blocks assigned to the same category in one or more continuous tracks on the hard disk by the processor.

In one aspect of the present invention, the determining the I/O characteristics for the plurality of blocks on the hard disk by the processor comprises determining secure deletion requirements for the plurality of blocks on the hard disk by the processor, the secure deletion requirements comprising overwriting rates for the plurality of blocks; the assigning the plurality of blocks to the plurality of categories of I/O characteristics by the processor comprises assigning the plurality of blocks to a plurality of categories associated with the overwriting rates; and the clustering the content of the blocks assigned to the same category in the one or more continuous tracks on the hard disk by the processor comprises clustering the content of the blocks assigned to the same overwriting rate category in the one or more continuous tracks on the hard disk by the processor.

In one aspect of the present invention, the determining the I/O characteristics for the plurality of blocks on the hard disk by the processor comprises determining expected access frequencies for a given time period for the plurality of blocks on the hard disk by the processor; the assigning the plurality of blocks to the plurality of categories of I/O characteristics by the processor comprises: assigning the plurality of blocks to a plurality of categories of expected access frequencies for the given time period by the processor; and the clustering the content of the blocks assigned to the same category in the one or more continuous tracks on the hard disk by the processor comprises: clustering the content of the blocks assigned to the same category of expected access frequency in the one or more continuous tracks on the hard disk by the processor.

In one aspect of the present invention, the determining the I/O characteristics for the plurality of blocks on the hard disk by the processor comprises assigning a plurality of counters for the plurality of blocks of the hard disk by the processor, and for each of the plurality of blocks, incrementing by the processor the counter for the block each time a read operation or a write operation is performed on the block; the assigning the plurality of blocks to the plurality of categories of I/O characteristics by the processor comprises assigning one of the plurality of categories to each of the plurality of blocks by the processor, wherein the plurality of categories are defined based on thresholds of the plurality of counter values; the clustering the content of the blocks assigned to the same category in the one or more continuous tracks on the hard disk by the processor comprises clustering the content of the blocks assigned the same counter value category in the one or more continuous tracks on the hard disk by the processor.

In one aspect of the present invention, the determining the I/O characteristics for the plurality of blocks on the hard disk by the processor comprises maintaining a table comprising a number of accesses and remanence states of the plurality of blocks on the hard disk by the processor; the assigning the plurality of blocks to the plurality of categories of I/O characteristics by the processor comprises defining a space by the processor representing the plurality of blocks with attribute dimensions comprising the number of accesses, time, and the remanence states, placing objects representing the plurality of blocks within the space by the processor, and applying a K-means clustering algorithm on the objects by the processor using a plurality of categories of the attribute dimensions as classes; the clustering the content of the blocks assigned to the same category in the one or more continuous tracks on the hard disk by the processor comprises: storing the content of the plurality of blocks in each cluster in the space in the one or more continuous tracks on the hard disk by the processor.

In one aspect of the present invention, the method further comprises: performing at least one overwrite operation on at least one of the plurality of blocks of a track on the hard disk by the processor; determining by the processor if a predetermined threshold of overwrites for the block is reached; and in response to determining that the predetermined threshold of overwrites for the block is reached, refreshing content of adjacent tracks by the processor.

System and computer program products corresponding to the above-summarized methods are also described and claimed herein.

BRIEF DESCRIPTION OF THE SEVERAL VIEWS OF THE DRAWINGS

FIG. 2 is a flowchart illustrating an embodiment of a method for mitigating adjacent track erasures in hard disks according to the present invention.

FIG. 3 is a flowchart illustrating an embodiment of the method for mitigating adjacent track erasures in hard disks for secure deletion, according to the present invention.

FIG. 4 is a flowchart illustrating an embodiment of the method for mitigating adjacent track erasures in hard disks using a time dimension according to the present invention.

FIG. 5 is a flowchart illustrating an embodiment of the determining of the I/O characteristics of the plurality of blocks according to the present invention.

DETAILED DESCRIPTION

Figure 1:
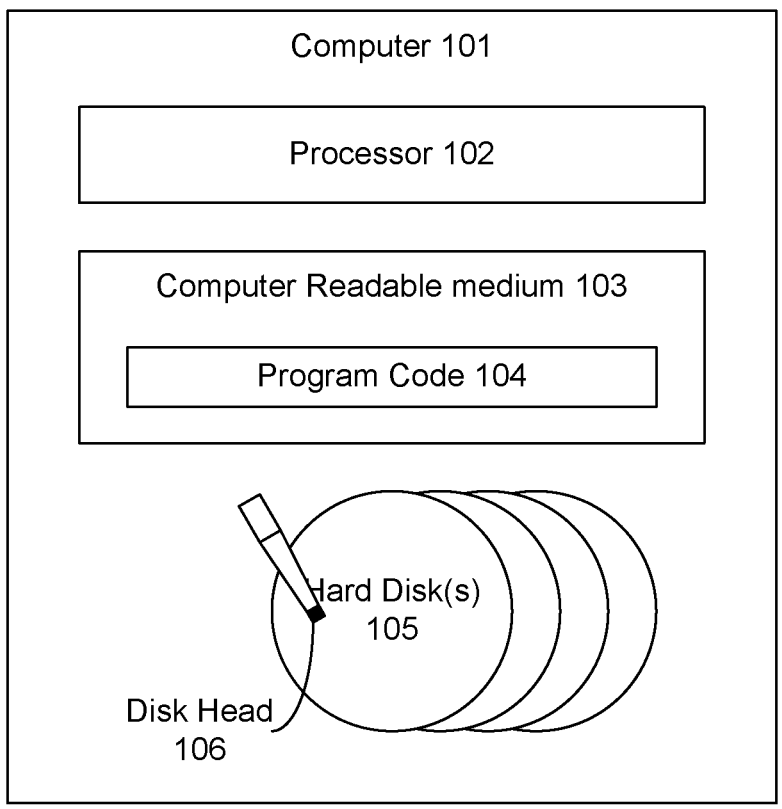
FIG. 1 illustrates an embodiment of a system for mitigating adjacent track erasures in hard disks according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™ (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for mitigating adjacent track erasures in hard disks according to the present invention. The system comprises a computer 101 operationally coupled to a hard disk drive comprising one or more hard disks 105, where data is read and written to tracks on the hard disk 105 by a disk head 106. The computer 101 is further operationally coupled to a processor 102 and a computer readable medium 103. The computer readable medium 103 stores computer readable program code 104 for implementing the method of the present invention. The processor 102 executes the program code 104 to mitigate adjacent track erasure in hard disks 105 according to the various embodiments of the present invention.

FIG. 2 is a flowchart illustrating an embodiment of a method for mitigating adjacent track erasures in hard disks according to the present invention. The method determines the I/O characteristics for a plurality of blocks on the hard disk 105 (201). The method then assigns the blocks to categories of I/O characteristics (202). The content of blocks assigned the same category are clustered in one or more continuous tracks on the hard disk 105 (203). The clustering of the blocks may be performed by moving the content to the continuous tracks, or by taking the assigned category into account when the block is initially written. In this embodiment, each block is assigned to one category. Blocks with similar I/O characteristics are thus clustered on one or more continuous tracks. By performing this clustering, blocks with a high number of I/O operations are grouped and stored on fewer tracks than if they were scattered across numerous tracks. This reduces the number of tracks experiencing a high number of I/O operations, and in turn, the amount of refreshing of adjacent tracks is reduced.

In one embodiment, the I/O characteristics comprise the access frequency of the plurality of blocks. The method determines the access frequencies of each block on the hard disk 105 (201). Blocks with high access frequencies are assigned to the same high access frequency category, while blocks with low access frequencies are assigned to the same low access frequency category (202). An example of high access frequency blocks include blocks storing a current time, where the current time is rewritten at regular intervals. The content of the blocks assigned to the same high access frequency category are then clustered in one or more continuous tracks (203). Only the tracks adjacent to the tracks storing the high access frequency blocks will be refreshed frequently. The content of the blocks assigned to the same low access frequency category are clustered in another set of continuous tracks (203). The tracks adjacent to the tracks storing the low access frequency blocks would be refreshed less frequently.

For example, assume that frequently accessed files are stored in blocks scattered across five tracks, requiring the refreshing of ten adjacent tracks. However, when these blocks are clustered in one track, only two adjacent tracks need to be refreshed, resulting in a gain in performance.

In another embodiment, the I/O characteristics pertain to the requirements for the secure deletion of files. FIG. 3 is a flowchart illustrating an embodiment of the method for mitigating adjacent track erasures in hard disks for secure deletion, according to the present invention. In this embodiment, the method determines the secure deletion requirements for a plurality of blocks of the hard disk 105, where the secure deletion requirements comprise overwriting rates for the blocks (301). The method assigns the blocks to categories associated with the overwriting rates (302). The content of the blocks assigned the same overwriting rate category are clustered in one or more continuous tracks on the hard disk 105 (303). The secure deletion requirements may be set by government regulation or by any other security standards.

For example, assume that a file stored on blocks scattered across five tracks is classified as high security, and the method determines that regulations require a rate of ten overwrites to the blocks to facilitate its secure deletion (301). Categories for different thresholds of overwrites are defined, and the blocks for this file are assigned to the same ten-overwrites-or-over category (302). The content of these blocks, i.e., the high security file, are then clustered in one or more continuous tracks of the hard disk 105 (303). By clustering these blocks in this manner, only two adjacent tracks need to be refreshed, as opposed to ten adjacent tracks if the blocks remained scattered.

When the secure deletion of the high security file is performed, the blocks in tracks storing the file are overwritten at least ten times. The method determines if the overwriting of the blocks have reached a predetermined threshold of overwrites, defined to determine when ATI or ATE may become a problem for adjacent tracks. In response to determining that the predetermined threshold has been reached, the content of the adjacent tracks are refreshed.

In another embodiment, the I/O characteristics comprise a time dimension, where the access frequencies of blocks may vary from time period to time period. FIG. 4 is a flowchart illustrating an embodiment of the method for mitigating adjacent track erasures in hard disks using a time dimension according to the present invention. The method determines the expected access frequencies for a given time period for the plurality of blocks (401). The method assigns the blocks to categories of expected access frequencies for the given time period (402). The content of the blocks assigned the same expected access frequency category are then clustered in one more continuous tracks on the hard disk 105 (403).

For example, assume that files containing Thanksgiving offers are stored on blocks scattered across five tracks. For the time period defined for the Thanksgiving holiday, the method determines that these blocks are expected to have high access frequencies for the Thanksgiving holiday (401). During the Thanksgiving holiday, the method assigns these blocks to the same high access frequency category (402). The content of the blocks, i.e., the files containing the Thanksgiving offers, are then clustered in continuous tracks of the hard disk 105 (403). By clustering the blocks in this manner, only two adjacent tracks need to be refreshed, as opposed to ten adjacent racks if the blocks remained scattered.

Although the embodiment are described with the I/O characteristics above, one of ordinary skill in the art will understand that a variety of I/O characteristics of the plurality of blocks may be used, alone or in combination, without departing from the spirit and scope of the present invention.

FIG. 5 is a flowchart illustrating an embodiment of the determining of the I/O characteristics of the plurality of blocks according to the present invention. The method assigns counters for the plurality of blocks of the hard disk 105 (501) for example, the counter may be stored in a table. In this embodiment, there is one counter for each block. Each time a read or write operation is performed on a block, the block's counter is incremented (502). The method assigns a category to each block, where categories are defined based on thresholds of counter values (503). The method clusters the content of the blocks assigned to the same counter value category in one or more continuous tracks on the hard disk 105 (504).

Figure 6:
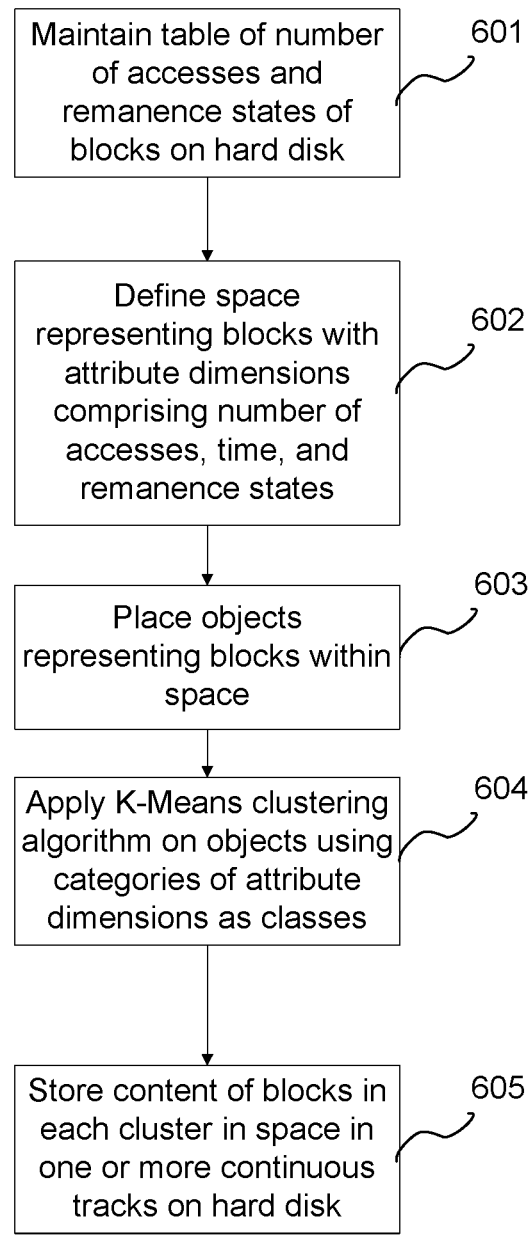
FIG. 6 is a flowchart illustrating an embodiment of the clustering of the plurality of blocks according to the present invention.

FIG. 6 is a flowchart illustrating an embodiment of the clustering of the plurality of blocks according to the present invention. The method maintains a table of the number of accesses and the remanence states of the plurality of blocks on the hard disk 105 (601). The method defines a space representing the blocks with the following attribute dimensions: number of accesses, time, and remanence state (602). For example, these dimensions can define the X, Y, and Z-axes of a three dimensional space. Objects representing the blocks are placed within the space (603). The K-Means clustering algorithm is then applied on the objects using categories of the attribute dimensions as the classes (604).

K-means is an unsupervised learning algorithm that solves clustering problems. The algorithm classifies a given data set through a certain number (k) of clusters fixed a priori. K centroids are defined, one for each cluster. Each point belonging to a given data set is assigned to the nearest centroid. K new centroids are then re-calculated as barycenters of the clusters resulting from the previous step. A new binding is then done between the same data set points and the nearest new centroid. A loop is thus generated. As a result of this loop, the k centroids change their locations step by step until no more changes occur, i.e., the centroids do not move any more This algorithm aims at minimizing an object function, such as $V=\Sigma_{i=1}^{k}\Sigma_{k_j \in S_i}(x_j-\mu_i)^2$, where there are k clusters=$S_i$, where i=1, 2, ... k, and $\mu_i$ is the centroid or mean point of all the point $x_i \in S_i$. The K-Means clustering algorithm is known in the art and will not be described further here.

The application of the K-Means algorithm results in the clustering of blocks with similar or same attribute dimensions. The content of the blocks in each cluster in the space are then stored in one or more continuous tracks on the hard disk 105 (604). The availability of continuous tracks on the hard disk 105 may be determined in a variety of ways. For example, on Direct Access Storage Devices (DASD), the availability of storage blocks within a storage subpool is recorded in an allocation control structure. Storage subpools are divided into allocation units which contain a fixed number of consecutive DASD storage blocks. Storage subpools are divided into allocation units to reduce the amount of data needed to record the availability of storage blocks. Storage is allocated to a requesting function in extents of consecutive allocation units. An extent of allocated storage is formed from a number of consecutive allocation units. The allocation units forming any allocated extent belong to the same storage subpool, and the storage blocks within an extent are consecutive DASD storage blocks. Extents allocated for use of the working store consist of fixed number of working storage allocation units. Any subpool block is accessed by a relative data set identifier and a relative block number within the data set. Space allocation on DASD using an allocation control structure is known in the art and will not be described further here.

Although the embodiment above is described using the K-means clustering algorithm, one of ordinary skill in the art will understand that other methods of clustering may be used without departing from the spirit and scope of the present invention.

A method, system, and computer program product for mitigating adjacent track erasures in hard disks have been disclosed. Blocks on a hard disk are assigned categories of I/O characteristics, and blocks assigned to the same category are clustered on one or more continuous tracks. By performing this clustering, blocks with a high number of I/O operations are grouped and stored on fewer tracks than if they were scattered cross numerous tracks. This reduces the number of tracks experiencing a high number of I/O operations, and in turn, the amount of refreshing of adjacent racks is reduced.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method implemented by a computing device for mitigating adjacent track erasures in hard disks, the computing device operationally coupled to a processor, the method comprising:
    determining input/output (I/O) characteristics for a plurality of blocks on a hard disk by the processor, comprising: determining secure deletion requirements for the plurality of blocks on the hard disk by the processor, the secure deletion requirements comprising overwriting rates for the plurality of blocks;
    assigning the plurality of blocks to a plurality of categories of I/O characteristics by the processor, comprising: assigning the plurality of blocks to a plurality of categories associated with the overwriting rates; and
    clustering content of the blocks assigned to the same category in one or more continuous tracks on the hard disk by the processor, comprising: clustering the content of the blocks assigned to the same overwriting rate category in the one or more continuous tracks on the hard disk by the processor.

2. The method of claim 1, further comprising: performing at least one overwrite operation on at least one of the plurality of blocks of a track on the hard disk by the processor; determining by the processor if a predetermined threshold of overwrites for the block is reached; and in response to determining that the predetermined threshold of overwrites for the block is reached, refreshing content of adjacent tracks by the processor.

3. A computer program product for mitigating adjacent track erasure in hard disks, the computer program product comprising:
a computer readable storage medium having computer readable program code embodied therewith, the computer readable program code configured to:
determine input/output (I/O) characteristics for a plurality of blocks on a hard disk, further configured to: determine secure deletion requirements for the plurality of blocks on the hard disk, the secure deletion requirements comprising overwriting rates for the plurality of blocks;
assign the plurality of blocks to a plurality of categories of I/O characteristics, further configured to: assign the plurality of blocks to a plurality of categories associated with the overwriting rates; and
cluster the content of the blocks assigned to the same category in one or more continuous tracks on the hard disk, further configured to: cluster the content of the blocks assigned to the same overwriting rate category in the one or more continuous tracks on the hard disk.

4. The computer program product of claim 3, wherein computer readable program code is further configured to: perform at least one overwrite operation on at least one of the plurality of blocks of a track on the hard disk; determine if a predetermined threshold of overwrites for the block is reached; and in response to determining that the predetermined threshold of overwrites for the block is reached, refresh content of adjacent tracks.

5. A system, comprising: at least one hard disk comprising a plurality of tracks, each track comprising a plurality of blocks; a processor; and a computer readable storage medium operationally coupled to the processor, the computer readable storage medium having computer readable program code embodied therewith to be executed by the processor, the computer readable program code configured to:
determine input/output (I/O) characteristics for a plurality of blocks on a hard disk, further configured to: determine secure deletion requirements for the plurality of blocks on the hard disk, the secure deletion requirements comprising overwriting rates for the plurality of blocks;
assign the plurality of blocks to a plurality of categories of I/O characteristics, further configured to:
assign the plurality of blocks to a plurality of categories associated with the overwriting rates; and
cluster content of the blocks assigned to the same category in one or more continuous tracks on the hard disk, further configured to: cluster the content of the blocks assigned to the same overwriting rate category in the one or more continuous tracks on the hard disk.

6. The system of claim 5, wherein computer readable program code is further configured to: perform at least one overwrite operation on at least one of the plurality of blocks of a track on the hard disk; determine if a predetermined threshold of overwrites for the block is reached; and in response to determining that the predetermined threshold of overwrites for the block is reached, refresh content of adjacent tracks.

7. A method implemented by a computing device for mitigating adjacent track erasures in hard disks, the computing device operationally coupled to a processor, the method comprising:
determining input/output (I/O) characteristics for a plurality of blocks on a hard disk by the processor comprises:
determining expected access frequencies for a given time period for the plurality of blocks on the hard disk by the processor;
assigning the plurality of blocks to a plurality of categories of I/O characteristics by the processor, comprising: assigning the plurality of blocks to a plurality of categories of expected access frequencies for the given time period by the processor; and
clustering content of the blocks assigned to the same category in one or more continuous tracks on the hard disk by the processor, comprising: clustering the content of the blocks assigned to the same category of expected access frequency in the one or more continuous tracks on the hard disk by the processor.

8. A method implemented by a computing device for mitigating adjacent track erasures in hard disks, the computing device operationally coupled to a processor, the method comprising:
determining input/output (I/O) characteristics for a plurality of blocks on a hard disk by the processor comprising: maintaining a table comprising a number of accesses and remanence states of the plurality of blocks on the hard disk by the processor;
assigning the plurality of blocks to a plurality of categories of I/O characteristics by the processor, comprising: defining a space by the processor representing the plurality of blocks with attribute dimensions comprising the number of accesses, time, and the remanence states, placing objects representing the plurality of blocks within the space by the processor, and applying a K-means clustering algorithm on the objects by the processor using a plurality of categories of the attribute dimensions as classes; and
clustering content of the blocks assigned to the same category in one or more continuous tracks on the hard disk by the processor, comprising:
storing the content of the plurality of blocks in each cluster in the space in the one or more continuous tracks on the hard disk by the processor.

9. The method of claim 8, wherein the determining the I/O characteristics for the plurality of blocks on the hard disk by the processor comprises: assigning a plurality of counters for the plurality of blocks of the hard disk by the processor; for each of the plurality of blocks, incrementing by the processor the counter for the block each time a read operation or a write operation is performed on the block; and
storing the counter in the table.

10. A computer program product for mitigating adjacent track erasure in hard disks, the computer program product comprising:
a computer readable storage medium having computer readable program code embodied therewith, the computer readable program code configured to;
determine input/output (I/O) characteristics for a plurality of blocks on a hard disk, further configured to: determine expected access frequencies for a given time period for the plurality of blocks on the hard disk;
assign the plurality of blocks to a plurality of categories of I/O characteristics, further configured to:
assign the plurality of blocks to a plurality of categories of expected access frequencies for the given time period; and
cluster content of the blocks assigned to the same category in one or more continuous tracks on the hard disk, further configured to: cluster the content of the blocks assigned to the same category of expected access frequency in the one or more continuous tracks on the hard disk.

11. A computer program product for mitigating adjacent track erasure in hard disks, the computer program product comprising:
a computer readable storage medium having computer readable program code embodied therewith, the computer readable program code configured to;
determine input/output (I/O) characteristics for a plurality of blocks on a hard disk, further configured to: maintain a table comprising a number of accesses and remanence states of the plurality of blocks on the hard disk; assign the plurality of blocks to a plurality of categories of I/O characteristics, is configured to: define a space representing the plurality of blocks with attribute dimensions comprising the number of accesses, time, and the remanence states,
place objects representing the plurality of blocks within the space, and
apply a K-means clustering algorithm on the objects using a plurality of categories of the attribute dimensions as classes; and
cluster content of the blocks assigned to the same category in one or more continuous tracks on the hard disk, further configured to: store the content of the plurality of blocks in each cluster in the space in the one or more continuous tracks on the hard disk.

12. The computer program product of claim 11, wherein the computer readable program code configured to determine the I/O characteristics for the plurality of blocks on the hard disk is further configured to:
assign a plurality of counters for the plurality of blocks of the hard disk;
for each of the plurality of blocks, increment the counter for the block each time a read operation or a write operation is performed on the block; and
store the counter in the table.

13. A system, comprising: at least one hard disk comprising
a plurality of tracks, each track comprising a plurality of blocks;
a processor; and
a computer readable storage medium operationally coupled to the processor, the computer readable storage medium having computer readable program code embodied therewith to be executed by the processor, the computer readable program code configured to:
determine input/output (I/O) characteristics for a plurality of blocks on a hard disk, further configured to: determine expected access frequencies for a given time period for the plurality of blocks on the hard disk;
assign the plurality of blocks to a plurality of categories of I/O characteristics, further configured to:
assign the plurality of blocks to a plurality of categories of expected access frequencies for the given time period; and
cluster content of the blocks assigned to the same category in one or more continuous tracks on the hard disk, further configured to: cluster the content of the blocks assigned to the same category of expected access frequency in the one or more continuous tracks on the hard disk.

14. A system, comprising: at least one hard disk comprising a plurality of tracks, each track comprising a plurality of blocks;
a processor; and
a computer readable storage medium operationally coupled to the processor, the computer readable storage medium having computer readable program code embodied therewith to be executed by the processor, the computer readable program code configured to:
determine input/output (I/O) characteristics for a plurality of blocks on the a hard disk, further configured to: maintain a table comprising a number of accesses and remanence states of the plurality of blocks on the hard disk;
assign the plurality of blocks to a plurality of categories of I/O characteristics, further configured to: define a space representing the plurality of blocks with attribute dimensions comprising the number of accesses, time, and the remanence states,
place objects representing the plurality of blocks within the space, and
apply a K-means clustering algorithm on the objects using a plurality of categories of the attribute dimensions as classes; and
cluster content of the blocks assigned to the same category in one or more continuous tracks on the hard disk, further configured to: store the content of the plurality of blocks in each cluster in the space in the one or more continuous tracks on the hard disk.

15. The system of claim 14, wherein the computer readable program code configured to determine the I/O characteristics for the plurality of blocks on the hard disk is further configured to:
assign a plurality of counters for the plurality of blocks of the hard disk;
for each of the plurality of blocks, increment the counter for the block each time a read operation or a write operation is performed on the block; and
store the counter in the table.

16. A computer implemented method for mitigating adjacent track erasures in hard disks, the computer operationally coupled to a processor, the method comprising:
determining input/output (I/O) characteristics for a plurality of blocks on the hard disk by the processor, the I/O characteristics comprising secure deletion requirements, the secure deletion requirements comprising overwriting rates for the plurality of blocks, wherein the I/O characteristics further comprises expected access frequencies for a given time period for the plurality of blocks on the hard disk, further comprising: determining the expected access frequencies for the given time period for the plurality of blocks on the hard disk by the processor; assigning the plurality of blocks to a plurality of categories associated with the overwriting rates by the processor, further comprising: assigning the plurality of blocks to a plurality of categories of expected access frequencies for the given time period by the processor; and
clustering content of the blocks assigned to the same overwriting rate category in one or more continuous tracks on the hard disk by the processor, further comprising: clustering the content of the blocks assigned to the same category of expected access frequency in the one or more continuous tracks on the hard disk by the processor.

17. The method of claim 16, further comprising:
performing at least one overwrite operation on at least one of the plurality of blocks of a track on the hard disk by the processor; determining by the processor if a predetermined threshold of overwrites for the block is reached; and in response to determining that the predetermined threshold of overwrites for the block is reached, refreshing content of adjacent tracks by the processor.

18. A computer implemented method for mitigating adjacent track erasures in hard disks, the computer operationally coupled to a processor, the method comprising:
  determining input/output (I/O) characteristics for a plurality of blocks on the hard disk by the processor, the I/O characteristics comprising secure deletion requirements, the secure deletion requirements comprising overwriting rates for the plurality of blocks, further comprising: maintaining a table comprising a number of accesses and remanence states of the plurality of blocks on the hard disk by the processor;
  assigning the plurality of blocks to plurality of categories associated with the overwriting rates by the processor further comprising: defining a space by the processor representing the plurality of blocks with attribute dimensions comprising the number of accesses, time, and the remanence states, and placing objects representing the plurality of blocks within the space by the processor, and applying a K-means clustering algorithm on the objects by the processor using a plurality of categories of the attribute dimensions as classes; and clustering content of the blocks assigned to the same overwriting rate category in one or more continuous tracks on the hard disk by the processor, further comprising: storing the content of the plurality of blocks in each cluster in the space in the one or more continuous tracks on the hard disk by the processor.

19. The method of claim 18, wherein the I/O characteristics further comprises counter values for the plurality of blocks on the hard disk, wherein the determining the I/O characteristics for the plurality of blocks on the hard disk by the processor, the I/O characteristics comprising secure deletion requirements, the secure deletion requirements comprising the overwriting rates for the plurality of blocks, further comprises:
  assigning a plurality of counters for the plurality of blocks of the hard disk by the processor, and
  for each of the plurality of blocks, incrementing by the processor the counter for the block each time a read operation or a write operation is performed on the block;
  wherein the assigning the plurality of blocks to the plurality of categories associated with the overwriting rates by the processor further comprises: assigning one of the plurality of categories to each of the plurality of blocks by the processor, wherein the plurality of categories are defined based on thresholds of the plurality of counter values;
  wherein the clustering the content of the blocks assigned to the same overwriting rate category in the one or more continuous tracks on the hard disk by the processor further comprises: clustering the content of the blocks assigned the same counter value category in the one or more continuous tracks on the hard disk by the processor.

* * * * *